Figure 1:
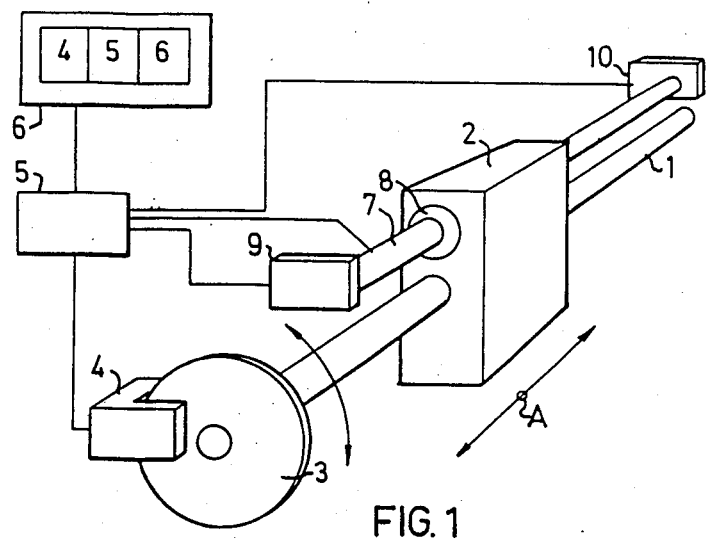

United States Patent [19]
Backlund et al.

[11] Patent Number: 4,738,030
[45] Date of Patent: Apr. 19, 1988

[54] ARRANGEMENT FOR COMPENSATING FOR PLAY IN MEASURING SYSTEMS

[76] Inventors: Ulf E. H. H. Backlund, Tolvmansvägen 27, S-191 71 Sollentuna; Carl U. Ungerstedt, Mjölnarstigen 11, S-181 46 Lidingö, both of Sweden

[21] Appl. No.: 916,635

[22] Filed: Oct. 8, 1986

[30] Foreign Application Priority Data

Oct. 18, 1985 [SE] Sweden ............................. 8504911

[51] Int. Cl.⁴ .............................................. G01B 3/00
[52] U.S. Cl. ................................................. 33/125 R
[58] Field of Search ............. 33/125 R, 125 A, 125 B, 33/125 C

[56] References Cited

U.S. PATENT DOCUMENTS 3,478,436 11/1969 Barnes ................................... 33/170
4,091,541 5/1978 DiCiaccio ......................... 33/125 R Primary Examiner—Harry N. Haroian

[57] ABSTRACT

The invention relates to an invention for compensating for play in a measuring system in which a measuring arrangement is connected via a mechanical transmission system to a body, the movement of which is to be measured, and in which the measuring result is processed in an electric signal processing unit. The moveable body is provided with a friction coupling and a friction rod extends through the friction coupling. The rod is provided with a stationarily mounted arrangement which counteracts movement of the friction element and detects the occurrence of a counteracting force. This force can be detected electrically. The signal processing unit has a control input which is connected for sensing the arrangement and processes solely signals obtained from the measuring arrangement when a counteracting force is detected.

8 Claims, 1 Drawing Sheet

ARRANGEMENT FOR COMPENSATING FOR PLAY IN MEASURING SYSTEMS

The present invention relates to an arrangement for compensating for play in measuring systems.

Various different forms of sensors are used to measure and record the linear and rotational movement of a body. These sensors may have the form of optical sensors, magnetic sensors, resistive sensors etc., which are connected to the body whose movements are to be measured. In those cases in which the sensor cannot be connected directly to the body, but requires some form of mechanical intermediate transmission coupling, such as a link coupling or gear coupling, there is a risk that due to play in the transmission the measuring result obtained will be incorrect. If the extent of the play is known and is of constant magnitude, it is possible, of course, to make compensations. The play, however, may vary in distance along the length of the body being measured and may also change with time, inter alia as a result of wear. A particularly serious problem is encountered in the case of reciprocating bodies when movement is to be measured and recorded in both movement directions.

These problems are solved in a simple, inexpensive and reliable manner by means of an arrangement according to the invention having the characteristic features set forth below.

Figure 2:
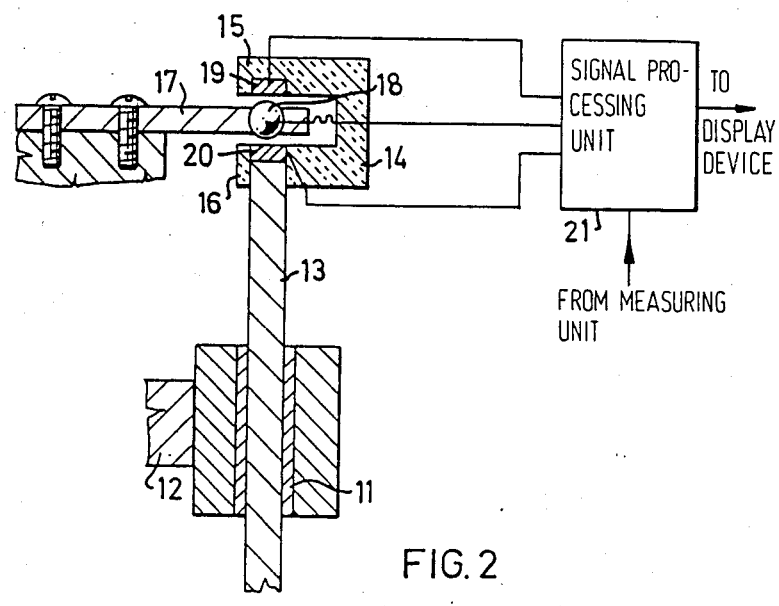

The invention will now be described with reference to the accompanying drawing, in which FIG. 1 illustrates a first embodiment of the arrangement according to the invention; and FIG. 2 illustrates a second embodiment of the invention.

One example of apparatus or machinery in which play is normally encountered in the transmission or drive mechanism, unless the machine components are manufactured with great accuracy, is a rotating screw, such as the screw 1 illustrated schematically in FIG. 1, said screw generating reciprocal movement in the directions shown by the arrows A. Mounted on the screw 1 is a nut 2 which moves linearly along the screw as the screw rotates. The nut 2 is, in turn, firmly connected to the element (not shown) to be guided for linear movement and the linear position of which along the screw must be capable of being exactly defined. In the illustrated embodiment the position of the nut 2 on the screw 1 is determined with the aid of an optically readable code disc 3 which is fitted to one end of the screw and which is embraced by a bifurcate reading device 4.

The signal, most often in pulse form, obtained from the bifurcate reading device 4 is fed to a signal processing unit 5, which converts the signal into suitable increments representing longitudinal movement of the nut along the screw and with which previously recorded positional values are increased or decreased, in accordance with the direction in which the code disc rotates. These addition and subtraction processes are preferably effected in an arithmetical unit (not shown). The calculated position of the nut is presented on a display 6, which preferably has the form of a digital indicator.

Rotation of the screw 1 is registered through the code disc 3 as movement of the nut 2. The nut 2, however, will not move until all play between the nut and the screw has been taken up. Thus, the code disc will register solely the movement that has been carried out by the screw, and not the movement carried out by the nut.

The arrangement according to the invention minimizes the source of error represented by play in the transmission mechanism, by means of the modification described below.

A rod 7 is connected to the nut 2, via a friction bushing 8, so as to accompany the movement of the nut along the screw. Linear movement of the screw 7 is restricted by two electrical contact plates 9 and 10, both of which are connected electrically to a control input on one side of the unit 5, and is adapted so that said movement is smaller than the smallest division of the code disc 3. The rod 7 is made of an electrically conductive material and is connected to the control input on the unit 5 in some suitable manner. When the rod reaches one of the aforesaid contact plates 9 or 10, the friction between the nut 2 and the rod 7 will be overcome. Movement of the nut 2 can continue. If the nut moves towards the code disc 3, the rod will remain in contact with the terminal contact plate 9. When movement of the nut is reversed, the unit 5 is prevented from reading information from the code disc until the rod moves out of contact with the contact plate 9 and actual movement of the nut has commenced. The rod will accompany the nut 2 in its movement along the screw and the contact point is shifted from the plate 9 to the plate 10. When movement is again reversed, the pulses deriving from the code disc are blocked until the rod moves out of contact with the contact plate 10 and the nut 2 has begun to move.

It will be understood that the electrical contact plates 9 and 10 can be replaced with pressure sensors, e.g. of the piezoelectric type, placed between a respective terminal plate and the opposing end of the rod 7.

FIG. 2 illustrates a second embodiment of the arrangement according to the invention. The actual feed mechanism and link arrangement preceding that part of the machine in which play may occur are not shown in FIG. 2, since these preceding arrangements do not form any part of the invention and since they can take many different forms.

In the embodiment illustrated in FIG. 2 a rod 13 is connected via a friction coupling 11 to a moveable unit 12, the movement of which is to be determined. Mounted on one end of the rod 13 is a bifurcate device having legs 15 and 16 which extend at right angles to the axial direction of the rod 13. Arranged between the legs 15 and 16 is one end of a rigid tongue 17 which is firmly attached at its other end to a stationary part of the machine and which is provided in the vicinity of said one end with a ball 18 of electrically conductive material having low oxidizing tendencies, e.g. gold. Each leg 15 and 16 is provided with an electrical contact part 19 and 20 at respective locations opposite the ball 18. The ball 18 and the electrical contacts 19 and 20 are connected to a control input of a signal processing unit 21, which is essentially of the same kind as the unit 5 in the FIG. 1 embodiment and has the same function as said unit. The electrical contacts 19 and 20 are insulated from one another, preferably by manufacturing the bifurcate device, with the exception of the contacts 19,20 from an electrically insulating material.

The distance between the ball 18 and respective contacts 19, 20 has been greatly exaggerated in the Figure, for the sake of illustration. In reality, this distance may be as small as 3 micrometers, i.e. a clearance in the transition from one contact to the other of solely 3 micrometers, which is a much smaller clearance than that obtained in conventional link transmission systems.

The embodiment illustrated in FIG. 2 is preferred over the embodiment illustrated in FIG. 1, since it is less responsive to temperature than the FIG. 1 embodiment, due to the small extension of the ball 18 in the movement direction.

It will be understood that many modifications can be made within the scope of the invention.

We claim:

1. An arrangement for compensating for play in a measuring system in which a measuring arrangement is connected, via a mechanical transmission system, to a body whose movement is to be measured, and in which the measuring result is processed in an electronic signal processing unit, characterized in that the body is provided with a friction coupling and a friction element extending through the friction coupling; in that the friction element is provided with a stationarily mounted arrangement which counteracts movement of the friction element and detects the ocurrence of a counteracting force, this force being electrically detectable; and in that the signal processing unit has a control input which is connected for sensing the arrangement and is constructed solely to process signals which are produced by the measuring arrangement in response to a detected counteracting force.

2. An arrangement according to claim 1, characterized in that the friction element is provided at one end in its direction of movement with a bifurcate device, the legs of which extend at right angles to said direction of movement of the friction element; in that the free end of a stationarily mounted tongue is located between said legs; and in that sensing means for detecting the occurrence of a counteracting force are arranged on a respective side of the free end of the tongue.

3. An arrangement according to claim 2, characterized in that each of the mutually opposing sides of the legs of said bifurcate device is provided with respective electrical contact parts which are mutually insulated from one another; and in that the free end of the tongue is provided with an electrical contact means opposite the contacts on said legs; and in that the two contact parts and the contact means are electrically connected to the control input of the signal processing unit.

4. An arrangement according to claim 3, characterized in that when the contact means provided on the tongue is in contact with one of said contact parts the distance to the other of said contact parts is about 3 micrometers.

5. An arrangement according to claim 2, characterized in that the sensing means is a pressure sensing element, e.g. a piezoelectric type sensing element.

6. An arrangement according to claim 1, characterized in that the friction element is a rod and in that the stationarily mounted arrangement incorporates two stationary elements, one at each end of the rod; and in that sensing means for detecting the occurrence of a counteracting force are arranged for sensing between each element and the rod.

7. An arrangement according to claim 6, characterized in that when reversing the direction of movement of the body the counteracting force is indicated as having commenced immediately the sensing means which detected the counteracting force prior to the reversal of said movement direction detects the absence of force subsequent to starting said reversed movement.

8. An arrangement according to claim 2, characterized in that when reversing the direction of movement of the body the counteracting force is indicated as having commenced immediately the sensing means which detected the counteracting force prior to the reversal of said movement direction detects the absence of force subsequent to starting said reversed movement.

* * * * *